(12) United States Patent
Vinogradov

(10) Patent No.: US 8,313,031 B2
(45) Date of Patent: Nov. 20, 2012

(54) ADAPTIVE APERTURE FOR AN IMAGING SCANNER

(75) Inventor: Igor Vinogradov, New York, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 456 days.

(21) Appl. No.: 11/731,504

(22) Filed: Mar. 30, 2007

(65) Prior Publication Data

US 2008/0239140 A1  Oct. 2, 2008

(51) Int. Cl.
*G06K 7/10* (2006.01)
*G03B 7/00* (2006.01)

(52) U.S. Cl. ..................... 235/462.2; 348/362
(58) Field of Classification Search ............... 235/462.2; 348/362
See application file for complete search history.

(56) References Cited

U.S. PATENT DOCUMENTS

| | | | |
|---|---|---|---|
| 4,818,886 A * | 4/1989 | Drucker | 250/566 |
| 5,347,121 A * | 9/1994 | Rudeen | 250/235 |
| 6,832,729 B1 * | 12/2004 | Perry et al. | 235/472.01 |
| 2002/0017567 A1 * | 2/2002 | Connolly et al. | 235/472.02 |
| 2003/0160949 A1 * | 8/2003 | Komatsuda et al. | 355/71 |
| 2005/0094002 A1 * | 5/2005 | Ohashi | 348/240.99 |
| 2005/0219554 A1 * | 10/2005 | Tobiason et al. | 356/614 |
| 2006/0038017 A1 | 2/2006 | Carlson et al. | |
| 2007/0000993 A1 * | 1/2007 | Graef et al. | 235/379 |
| 2007/0119942 A1 * | 5/2007 | Barsotti et al. | 235/462.24 |

* cited by examiner

*Primary Examiner* — Daniel Hess
*Assistant Examiner* — David Tardif
(74) *Attorney, Agent, or Firm* — Nong-Qiang Fan

(57) ABSTRACT

An apparatus and method is provided for focusing an image of a target object. The apparatus comprises imaging circuitry for analyzing an image reflected from a target object that is projected onto an imaging sensor coupled to the imaging circuitry. A fixed imaging lens having an optical axis in alignment with the imaging sensor focuses the reflected image onto the imaging sensor. One of a plurality of apertures located within a selectable aperture of varying sizes is selected for optically enhancing the fixed imaging lens. An actuator is coupled to the selectable aperture for selectively selecting the one of the plurality of apertures in a direction transverse to optical axis for optically enhancing the fixed imaging lens.

11 Claims, 12 Drawing Sheets

ADAPTIVE APERTURE FOR AN IMAGING SCANNER

FIELD OF THE INVENTION

The present invention relates generally to a field of imaging readers and scanners and more particularly to an imagining scanner or reader having an adjustable aperture size for enhancing an image projected on an imaging sensor.

BACKGROUND

Various electro-optical systems have been developed for reading optical indicia, such as bar codes. A bar code is a coded pattern of graphical indicia comprised of a series of bars and spaces of varying widths, the bars and spaces having differing light reflecting characteristics. Some of the more popular bar code symbologies include: Uniform Product Code (UPC), typically used in retail stores sales; Code 39, primarily used in inventory tracking; and Postnet, which is used for encoding zip codes for U.S. mail. Systems that read and decode bar codes employing charged coupled device (CCD) and complementary metal oxide semiconductor (CMOS) based imaging systems are typically referred to hereinafter as an imaging scanner.

Imaging scanners electro-optically transform the graphic indicia into electrical signals, which are decoded into alpha-numerical characters that are intended to be descriptive of the article or some characteristic thereof. The characters are then typically represented in digital form and utilized as an input to a data processing system for various end-user applications such as point-of-sale processing, inventory control and the like.

Imaging scanners that include CCD, CMOS, or other imaging configurations comprise a plurality of photosensitive elements (photosensors) or pixels typically aligned in an array pattern that could include a number of arrays. The imaging scanner can use light emitting diodes (LEDs), ambient light, or other light sources for illuminating a target object, e.g., a target bar code. An image is then reflected from the target bar code and focused through a lens of the imaging system onto the pixel array. As a result, the focusing lens generates an image from its field of view (FOV) that is projected onto the pixel array. Periodically, the pixels of the array are sequentially read out creating an analog signal representative of a captured image frame. The analog signal can be amplified by a gain factor, by for example, an operational amplifier. The amplified analog signal is digitized by an analog-to-digital converter. Decoding circuitry of the imaging system processes the digitized signals representative of the captured image frame and attempts to decode the imaged bar code. The decoding circuitry can be in the form of an application specific analog circuit (ASIC) or internal circuitry or programming relating to a microprocessor.

In general an imaging scanner with a fixed focusing lens fails to provide a sharp image over a wide range of scanning distances. As a result, autofocusing lens systems are employed to refocus the image through the imaging lenses to achieve relatively sharper images over, at least a wider range of scanning distances. An automatic focusing system is described in U.S. patent application Ser. No. 10/903,792 by Carlson et al. filed Jul. 30, 2004, which is assigned to the assignee of the present invention Symbol Technologies and is incorporated herein by reference for all purposes. Typically, an autofocusing system uses an actuator that is coupled to the imaging lens for movement of the imaging lens relative to an image sensor. Alternatively, a liquid lens can be used that changes its curvature or optical power in order to allow an image to come into focus. Such solutions are complex and costly to manufacture.

SUMMARY

The present invention relates to an apparatus for focusing an image of a target object. The apparatus comprises imaging circuitry for analyzing an image reflected from a target object that is focused onto an imaging sensor coupled to the imaging circuitry. A fixed imaging lens having an optical axis in alignment with the imaging sensor focuses the reflected image onto the imaging sensor. One of a plurality of apertures located within a selectable aperture of varying sizes is selected for optically enhancing the fixed imaging lens. An actuator is coupled to the selectable aperture for selectively selecting the one of the plurality of apertures in a direction transverse to optical axis for optically enhancing the reflected image onto the fixed imaging lens.

The present invention also relates to a method of focusing an image of a target object comprising receiving an image reflected from a target object onto a fixed position imaging lens having an optical axis in alignment with an imaging sensor and focusing the reflected image with the fixed position imaging lens from the target object onto the imaging sensor. The method further includes selecting one of a plurality of aperture sizes from a selectable aperture. The selected aperture is selectively positioned for optically enhancing the fixed imaging lens that focuses the reflected image onto the imaging sensor. The method also includes actuating the selectable aperture with an actuator in an orientation transverse to the optical axis of the fixed position imaging lens such that the one of the plurality of apertures obtains the selectively positioned orientation for optically enhancing the fixed position imaging lens that focuses the reflected image onto the imaging sensor.

The present invention further relates to an imaging scanner for analyzing and identifying a target object. The imaging scanner comprises imaging circuitry having an imaging engine for analyzing an image reflected from the target object that is focused onto an imaging sensor coupled to the imaging circuitry. A fixed imaging lens focuses the reflected image onto the imaging sensor. The imaging lens also includes an optical axis in alignment with the imaging sensor. A selectable aperture capable of forming a plurality of openings is positioned in the imaging scanner perpendicular to the optical axis formed by the fixed imaging lens such that the reflected image from the target object first passes through a selected one of the plurality of openings in the selectable aperture which optically enhances the fixed imaging lens. An actuator is coupled to the imaging circuitry for moving the selectable aperture in a direction transverse to the optical axis of the fixed imaging lens such that the selected one if the plurality of openings in the selectable aperture optically enhances the reflected image onto the fixed imaging lens.

The present invention yet further relates to an imaging scanner comprising a focusing system for analyzing a reflected image of a target object. The imaging scanner comprises a means for analyzing an image reflected from a target object. The reflected image is focused onto an imaging sensor that is coupled to the analyzing means. A fixed focusing means focuses the reflected image onto the imaging sensor. The fixed focusing means includes an optical axis in alignment with the imaging sensor. A selectable aperture is provided comprising a plurality of apertures of varying sizes. The selected aperture is selectively positioned for optically enhancing the fixed focusing means. An actuating means is coupled to the selectable aperture for selectively selecting one of the plurality of apertures in a direction transverse to the optical axis of the fixed focusing mean for optically enhancing the fixed focusing means.

BRIEF DESCRIPTION OF THE DRAWINGS

The foregoing features and other advantages of the present invention will become apparent to one skilled in the art to which the present invention relates upon consideration of the following description of the invention with reference to the accompanying drawings, in which.

DETAILED DESCRIPTION OF THE DRAWINGS AND PREFERRED EMBODIMENTS

Figure 1:
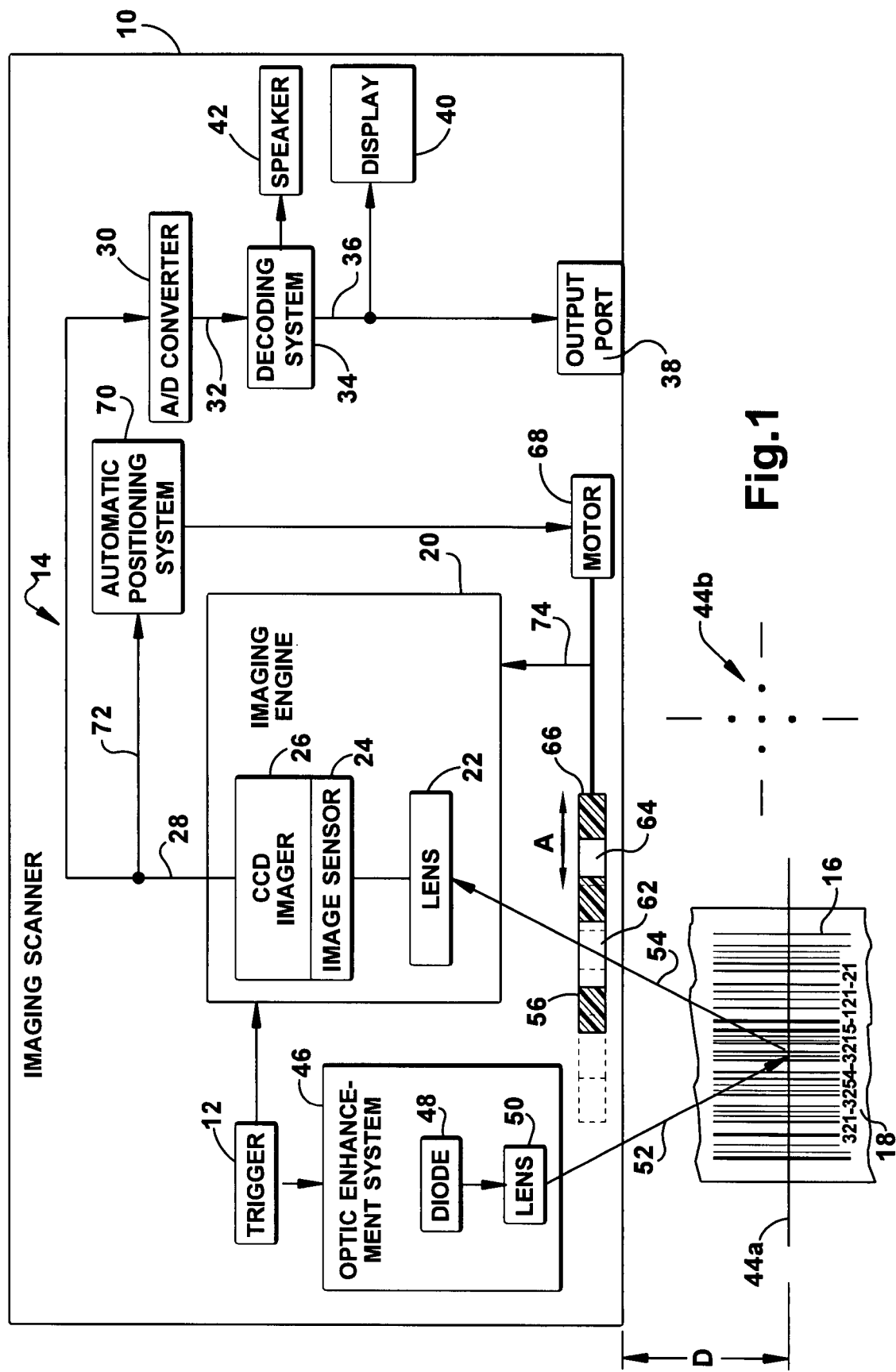
FIG. 1 is a schematic block diagram illustrating an exemplary embodiment of an imaging scanner constructed in accordance with the present invention.

An imaging scanner is shown schematically at 10 in FIG. 1. The imaging scanner 10, in addition to imaging and decoding both 1D and 2D bar codes and postal codes, is also capable of capturing images and signatures. In one exemplary embodiment of the present invention, the imaging scanner 10 is a hand held portable reader that can be carried and used by a user walking or riding through a store, warehouse or plant for reading bar codes for stocking and inventory control purposes. It should be recognized however that imaging scanner 10 of the present invention, to be further explained below, may be advantageously used in connection with any type of imaging-based automatic identification system including, but not limited to, bar code readers, signature imaging acquisition and identification systems, optical character recognition systems, fingerprint identification systems and the like. It is the intent of the present invention to encompass all such imaging-based automatic identification systems.

Referring again to FIG. 1, the imaging scanner 10 includes a trigger 12 coupled to the imaging scanner circuitry 14 for initiating reading of a target image 16 such as a bar code that is positioned on a target object 18 when the trigger 12 is pulled or pressed. The imaging scanner 10 further includes an imaging engine or scan engine 20 that can be a microprocessor, microcontroller, discrete circuitry, an application specific integrated circuit (ASIC) or any combination thereof without departing from the spirit or scope of the claimed invention. The scan engine 20 further includes a focusing lens 22, a image sensor 24 such as a pixel sensor or sensor pixel array having multiple dimensions, and an imager 26 such as a CMOS or CCD type imagers.

The focusing lens 22 focuses an image reflected from the target object 18 onto a photosensors or pixels located in the image sensor 24 of the imager 26. At predetermined intervals, the pixels in the imager 26 are transmitted, generating an analog signal 28 representative of a target image 16. The analog image signal 28 is then digitized by an analog-to-digital converter 30 and a digitized signal 32 is decoded by decoder circuitry 34. Decoded data 36, representative of the data/information coded in the target image 16 is then transmitted via a data output port 38 and/or displayed to a user of the imaging scanner 10 via a display 40. Upon achieving a good "read", imaging and decoding of the target image 16, such as a bar code, a speaker 42 is activated by the imaging engine 20 to indicate to the user that the target image 16 has been successfully read.

The scanning of the target image 16 can be enhanced by use of an aiming pattern 44 projected at the target image. The aiming pattern can be a line 44a or comprise a plurality of dots 44b or any combination thereof. The aiming pattern 44 is projected out of the imaging scanner 10 from an optic enhancement system 46. The aiming pattern can be emitted from a laser or light diode or diodes 48 and projected through, if needed a diffractive lens 50. The light emitting diode or diodes 48 also provide additional light 52 to illuminate the target image 16. However, it should be recognized that the target image 16 can be received through the imaging lens 22 from ambient light alone. A reflected target image 54 is projected toward the imaging lens 22.

A typical imaging scanner of the prior art acquires a spherical aberration when the light passes through the lens. The effect of spherical aberration impacts the entire image within the FOV. In the present invention, the amount or degree of spherical aberration is controlled in the target image 16 by passing the reflected target image 54 through a selectable aperture 56. The amount of spherical aberration is further controlled, as discussed below by the combination of optical elements used in conjunction with the selectable aperture 56.

Figure 2A:
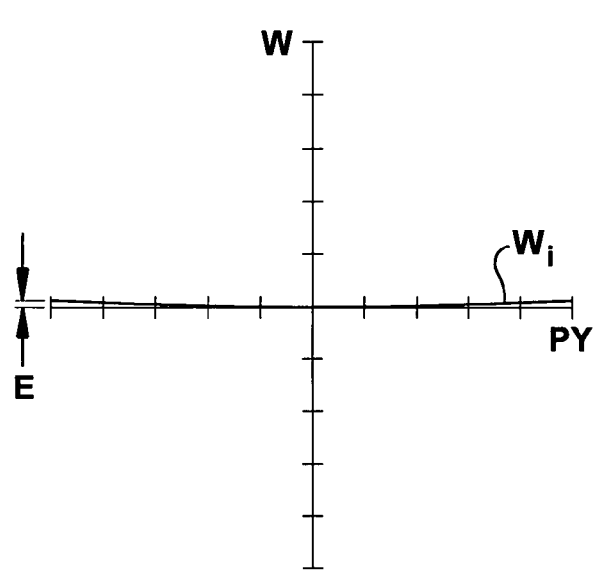
FIG. 2A is an graphical illustration of wavefront error in a substantially ideal imaging system.
Figure 2B:
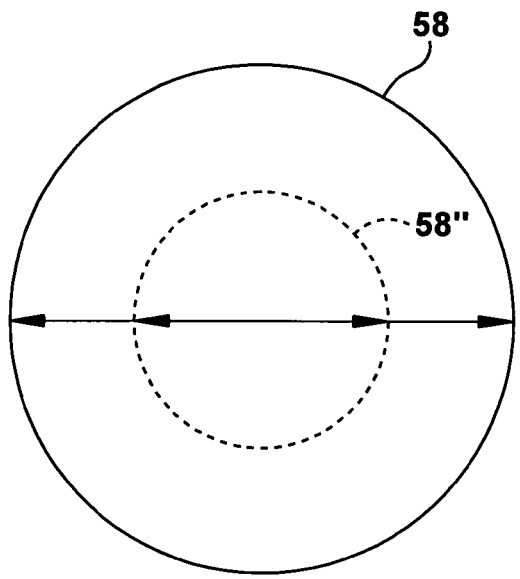
FIG. 2B is a illustration of a first and second aperture diameters.
Figure 3:
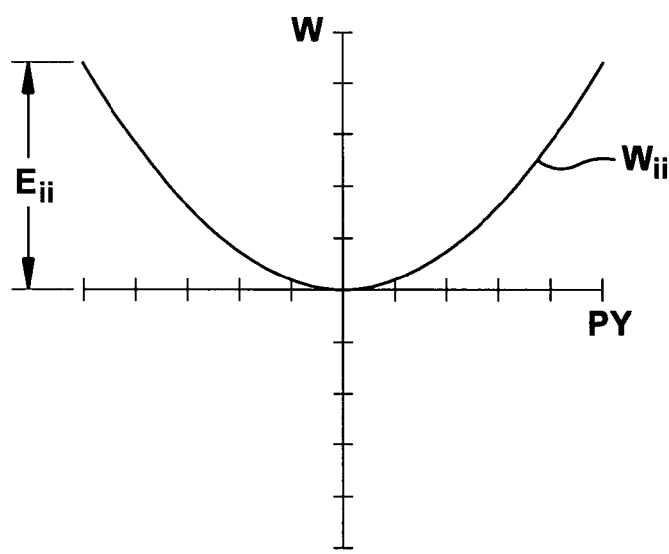
FIG. 3 is a graphical illustration of a wavefront error in an imaging system in which the object of interest is out of the working range of the imaging system and the image is defocused.

FIG. 2A illustrates the wavefront $W_i$ having nearly negligible amount of error, resulting from an object of interest located at a conjugated distance (in focus) with a substantially ideal imaging lens with a pupil with no aberrations. An imaging lens may introduce the wavefront $W_i$ error, symbolically identified by the distance E on the graph. The light from the object passes through aperture opening 58 depicted in FIG. 2B, which subsequently passes through an imaging lens or lenses (not shown). The x-axis (PY) is representative of the coordinates along the aperture 58 and the Y axis is representative of wavefront $W_i$ error E in waves. A wavefront $W_{ii}$ error $E_{ii}$ substantially increases as the object of interest is moved from the conjugated distance of an imaging lens, as illustrated in FIG. 3. As the object of interest is moved from the conjugated distance of the imaging lens, the image becomes out of focus or defocused relatively to an image produced by the substantially ideal flat wavefront $W_i$ illustrated in FIG. 2A. The further the object of interest is located from the conjugated distance, the larger the deviation in the wavefront $W_{ii}$ in FIG. 3 from the ideal flat wavefront illustrated in FIG. 2A, resulting in a blurrier or more out of focus image.

Figures 4, 5:
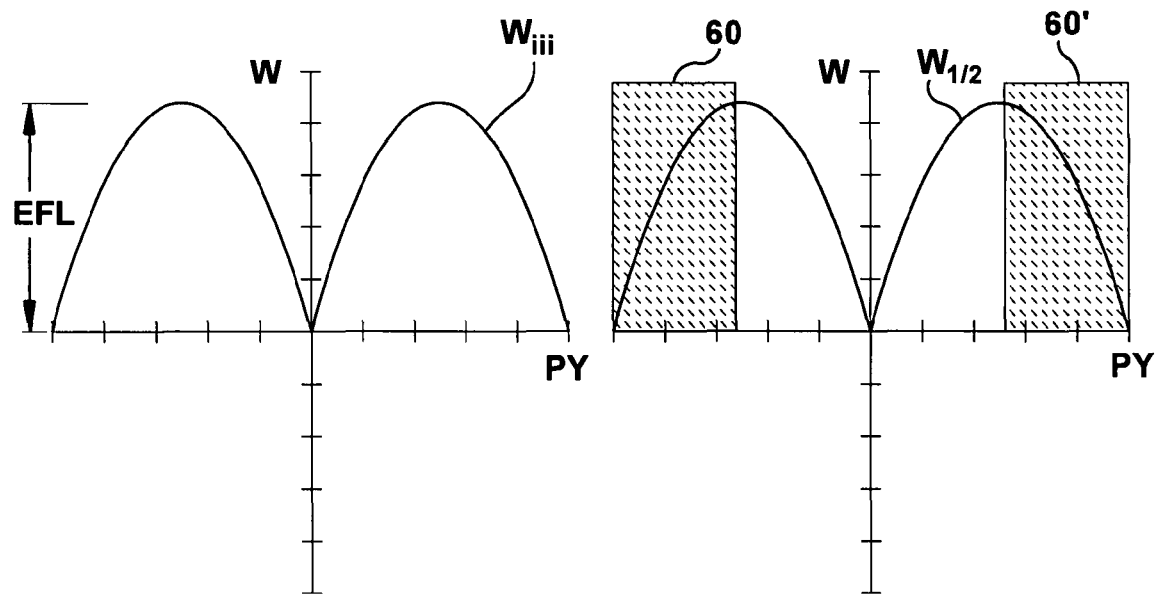
FIG. 4 is a graphical illustration of a wavefront error in a substantially ideal imaging system enhanced by an axicon element.
FIG. 5 is a graphical illustration of a wavefront error in an imaging system employing an axicon element and reduced aperture opening.
Figures 6, 7:
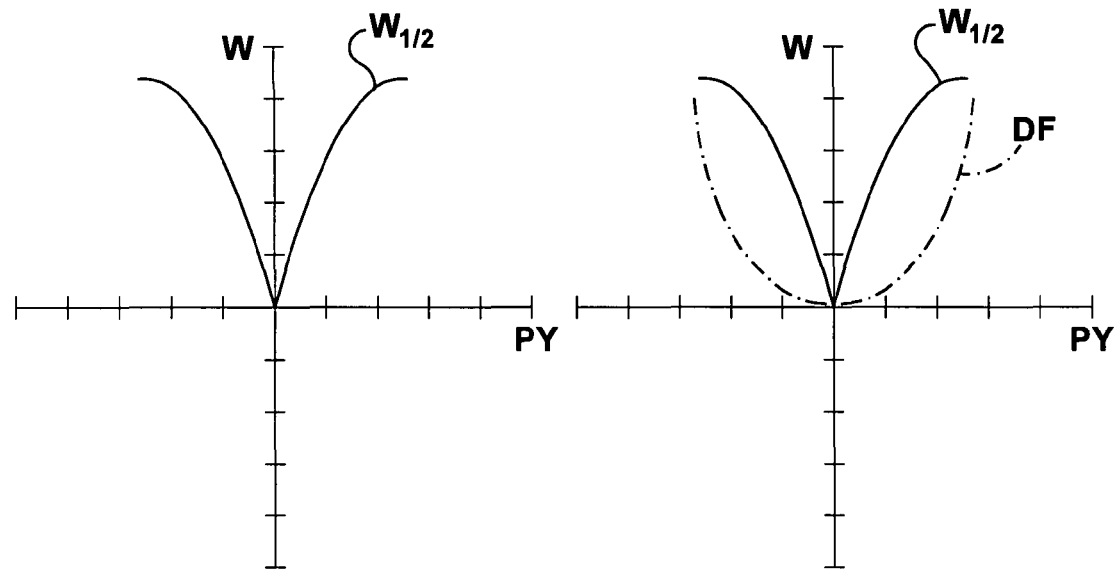
FIG. 6 is a graphical illustration of the resulting wavefront error of FIG. 5 once the wavefront is truncated by the smaller aperture.
FIG. 7 is a graphical illustration of a wavefront error further depicting a defocusing effect on the imaging system.

The introduction of an axicon element to the substantially ideal imaging system of FIG. 2A produces the wavefront which can be described by the curve illustrated in FIG. 4. The curve can be described by the following equation:

$$W_{iii} = A1 * PY + A2 * PY^2$$

where A1 and A2 are coefficients, which describe the shape of the wavefront. The wavefront projected in FIG. 4 illustrates the enhance capabilities provided to the imaging scanner 10 by the addition of the axicon element, increasing the depth of focus of the system that equates to extended depth of effective focal length (EFL) of the imaging system. In certain cases the range of EFL can be altered, shifted, or adjusted (optically enhanced) by the reduction of the aperture 58 to a smaller opening, for example one-half (½) the original opening size represented by 58' in FIG. 2B. Reducing the aperture diameter or changing F number of the imaging system effectively shifts the range of distances closer to the imaging lens where the image considered to be in focus and acceptable quality for decoding. The reduced aperture 58" further increases the imaging system's tolerance to defocus effects resulting from the movement of the object of interest. Boxes 60 and 60' represent the portion of the wavefront $W_{1/2}$ truncated by the reduced aperture diameter 58". FIG. 6 illustrates the remaining wavefront $W_{1/2}$ not truncated by the smaller aperture stop 58". FIG. 7 depicts a parabolic curve (shown in phantom) representing the defocused wavefront DF. If the target object is located too close to the imaging lens, the defocus effect occurs within the imaging lens, which can be compensated or eliminated by reducing the aperture size.

In the illustrated embodiments discussed below and as seen in FIG. 1, the selectable size aperture 56 has first 62 and second 64 apertures openings within and aperture stop 66. While only two openings are shown 62, 64, it should be appreciated that any number of apertures could be provided in any of the illustrated embodiments without departing from the spirit and scope of the claimed invention. Further, while the apertures in the illustrated embodiments of FIG. 1 and the figures to follow have been shown as having a generally circular shape, it should be appreciated that other sizes and shapes can be used, including for example, elliptical or rectangular apertures.

Referring again to FIG. 1, the reflected image 54 passes through the first aperture opening 62 and is projected through the imaging lens 22. For brevity, the elements identified in FIG. 1 that appear in any subsequent figure having the same reference character are intended to be identical unless otherwise noted. The aperture stop 66 and hence the selectable aperture 56, translate to multiple positions such that the reflected image selectively passes through the desired aperture 62, 64 by moving the stop 66 in the direction of the arrows A.

Figure 8:
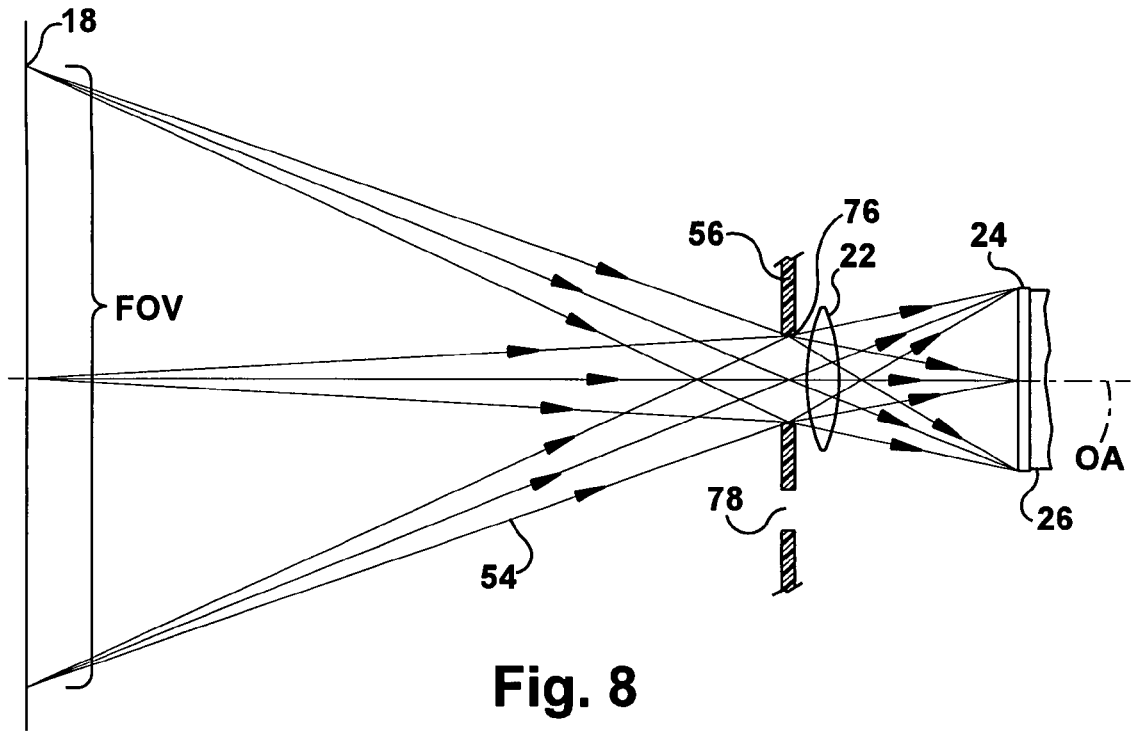
FIG. 8 is a schematic diagram of a selectable aperture constructed in accordance with one example embodiment of the present invention.

In the embodiment illustrated in FIG. 1, an actuator 68, such as a piezo-electric motor controls the position of the selectable size aperture 56, such that the use of the first or second 62, 64 aperture size respectively is selectively positioned to coincide with the optical axis "OA" of the imaging lens 22 (see e.g., FIG. 8). The actuator 68 is coupled and controlled by an auto-positioning system 70. The auto-positioning system 70 selectively determines the aperture of the selectable aperture 56 for controlling the focusing of the target image 16 in the imaging lens 22 and advances or retracts the selectable aperture 56 in the direction of arrows A, accordingly. The automatic positioning system 70 is controlled by the imaging engine 20 through a signal connection 72. Alternatively, the automatic positioning system is controlled by ASIC, or a combination of both the imaging engine 20 and an ASIC. A feed-back loop 74 provides positioning information to the imaging engine 20. In an alternative embodiment, the selectable aperture 56 is manually selected, by for example the operator of the imaging scanner 10. In yet another embodiment, the selectable aperture 56 can be moved between two hard stops where a feedback mechanism is not necessary. An accurate location of the selectable aperture 56 is provided by an accurate mechanical stop. Mechanical stops can be used in a manual or automatic mode. For example, in an automatic mode having a voice coil setup, a magnetic field moves the aperture between two accurate mechanical stops.

Figure 9:
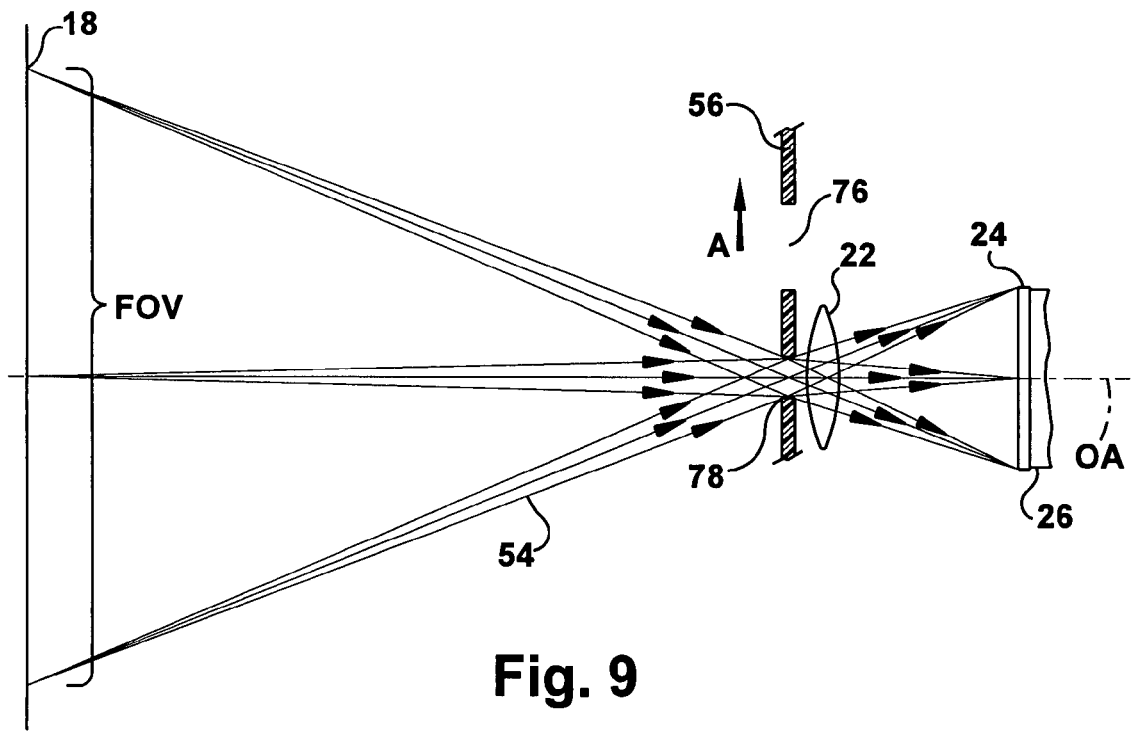
FIG. 9 is a schematic diagram of a selectable aperture constructed in accordance with the example embodiment of FIG. 8 in a second position.

Illustrated in FIGS. 8 and 9 is yet another embodiment in which the selectable aperture 56 is a non-transparent plate having first and second aperture openings 76 and 78, respectively. The first and second apertures 76, 78 limit a bundle of light from the reflected image 54 projected from the target object 18 illustrated by the ray tracings in FIGS. 8 and 9. The reflected image 54 passes through the respective first 76 and second 78 apertures and focused through imaging lens 22 onto the imaging sensor 24 of the imager 26. FIG. 9 illustrates the transition of the selectable aperture 56 to a second position (in the direction of the arrow A) such that the reflected image passes through the second aperture 78 having a relatively smaller opening than the first 76. The automatic positioning system 70 translates selectable aperture 56 if the imaging engine 20 determines the conditions, distance to the target object 18, or combination thereof, so requires. The apertures 76, 78 positioned in front of the imaging lens 22 as discussed above, provide an extended depth of focus and increased depth of EFL, which under certain application specific conditions is further relatively enhanced by the smaller aperture 78.

The auto-positioning system 70 receives the signal 72 from the imaging engine 20 and provides proper positioning relating to the aperture size located within the selectable size aperture 56. The imaging engine 20 uses an algorithm that includes the calculated distance D to the target object 18, as illustrated in FIG. 1 in its determination for positioning.

Several different techniques can be utilized for determining the calculated distance D. Examples of such techniques include those used for auto focusing systems and laser range finding. Laser range finding is accomplished by emitting a laser-aiming pattern from the imaging scanner 10 toward the target object 18. The laser beam is then reflected back to the imaging scanner 10. The beam paths to, and from the target object 18 are traced, forming geometric relationships that are used to determine the distance to the target object. More specifically, the distance to the target object 18 can be derived from algorithms in the imaging engine 20 based on a combination of these geometric relationships and related lens equations through which the laser beam passes. Alternatively, focusing techniques for determining distance utilize a search routine that allows the selectable aperture 56 to move among various size apertures in which the resulting target images 16 are analyzed. The movement of the selectable aperture 56 is performed via a search routine or heuristic in the imaging engine 20 that can be interpolated to an associated distance value that is used in determining the range to the target object. Each image is then analyzed for image clarity until a suitable aperture in the selectable aperture 56 is determined.

Figure 10:
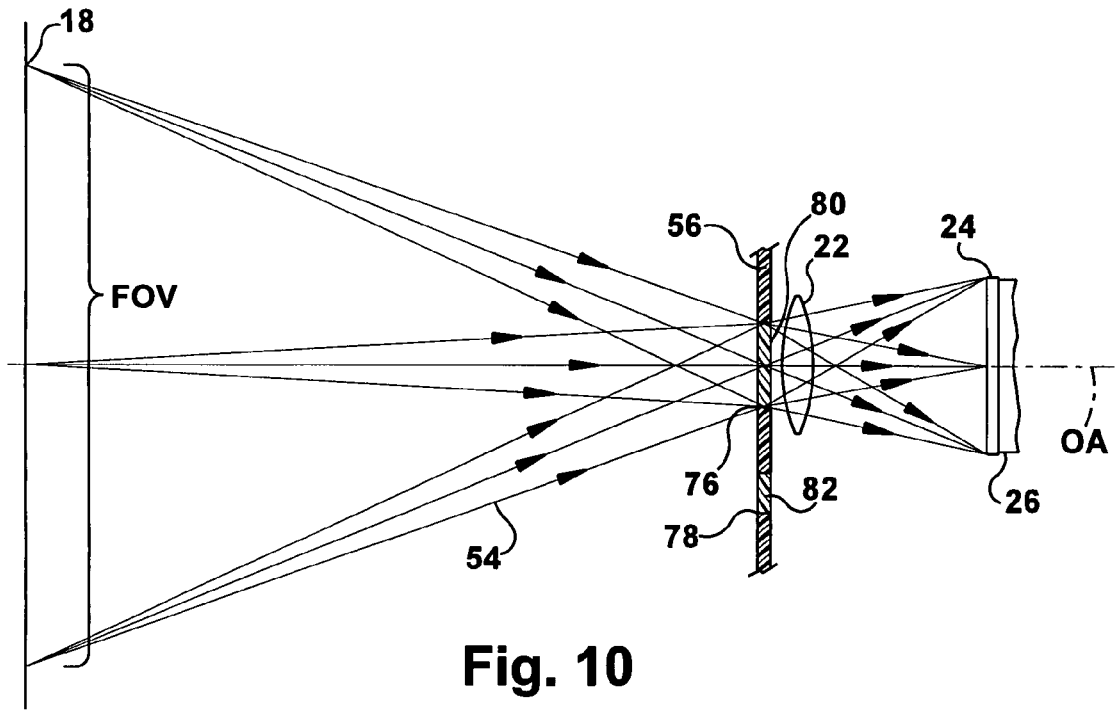
FIG. 10 is a schematic diagram of a selectable aperture constructed in accordance with another example embodiment of the present invention.
Figure 11:
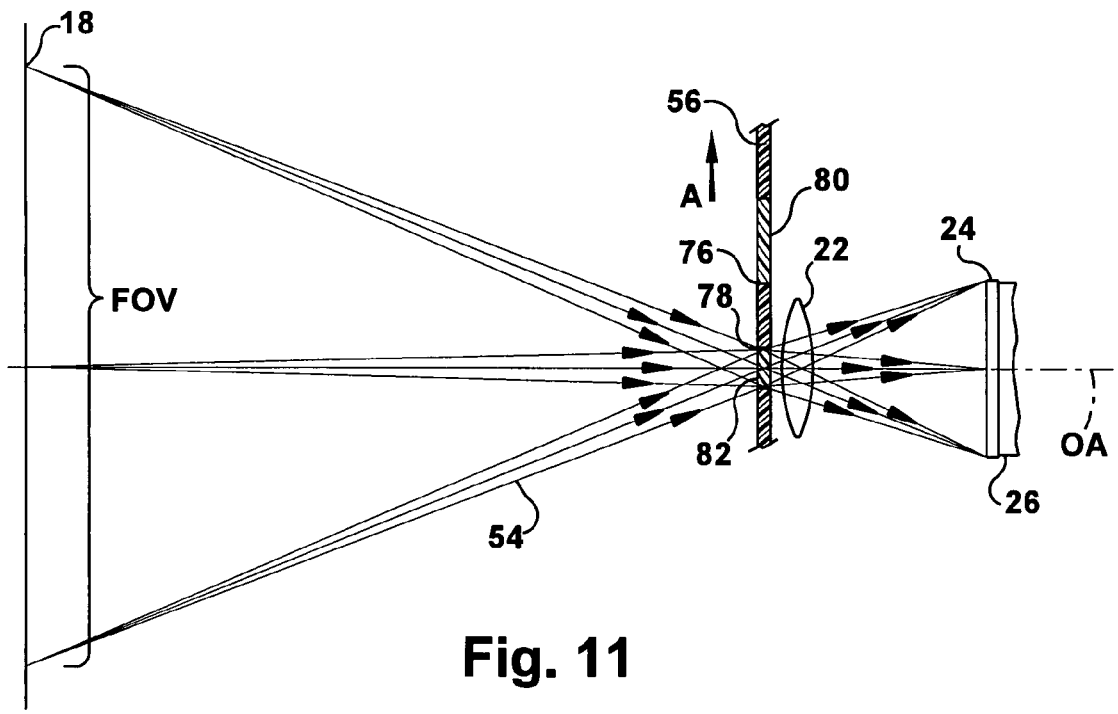
FIG. 11 is a schematic diagram of a selectable aperture constructed in accordance with the example embodiment of FIG. 10 in a second position.

Illustrated in FIGS. 10 and 11 is yet another embodiment incorporating varying size optical elements, for example first 80 and second 82 elements integrally molded into their respective first and second apertures 76 and 78 within the selectable aperture 56. The optical elements 80 and 82 include converging, diverging, spherical, aspherical, and cylindrical lenses, and could be any number, type, and/or shape of optical lenses without departing from the spirit and scope of the claimed invention. Although the selectable aperture 56 only shows two optical elements 80, 82 of differing size, any number of optical elements could be used.

In FIG. 10 the reflected target image 54 passes through the first aperture 76 of the selectable aperture 56 containing the first optical element 80 onto the imaging lens 22. Upon determination by the auto-position system 70, as discussed above or by manual movement, the selectable aperture 56 is advanced in the direction of the arrow A in FIG. 11. In FIG. 11, the reflected target image 54 passes through the second aperture 78 of the selectable aperture 56 containing the second optical element 82 onto the imaging lens 22. Accordingly, the auto-positioning system 70 can retract the selectable aperture 56 back to the position in FIG. 10 if the first aperture 76 and optical element 80 provide a more desirable image.

For the reasons described, apertures 76, 78 positioned in front of the imaging lens 22 provide an extended depth of focus and an increased depth of EFL, which under certain application specific conditions is further relatively enhanced by the smaller aperture 78. This focusing condition is further improved by the introduction of optical power provided by the optical elements 80, 82 integrated within the selectable aperture 56.

Figure 12:
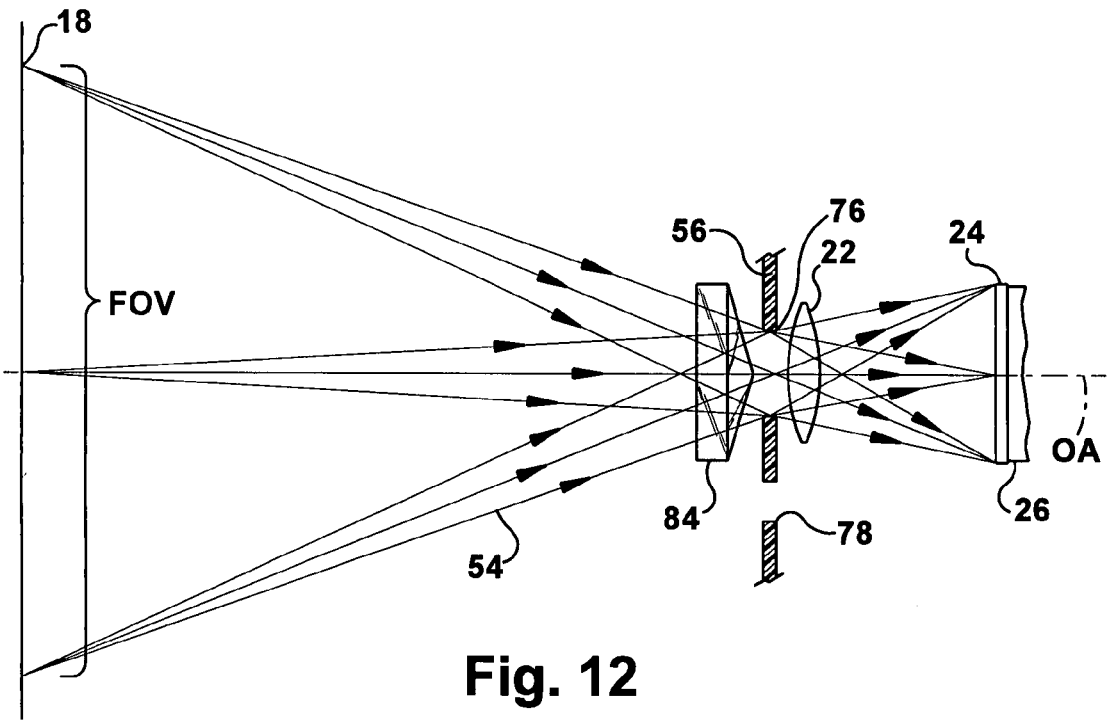
FIG. 12 is a schematic diagram of a selectable aperture constructed in accordance with another example embodiment of the present invention incorporating an axicon lens.
Figure 13:
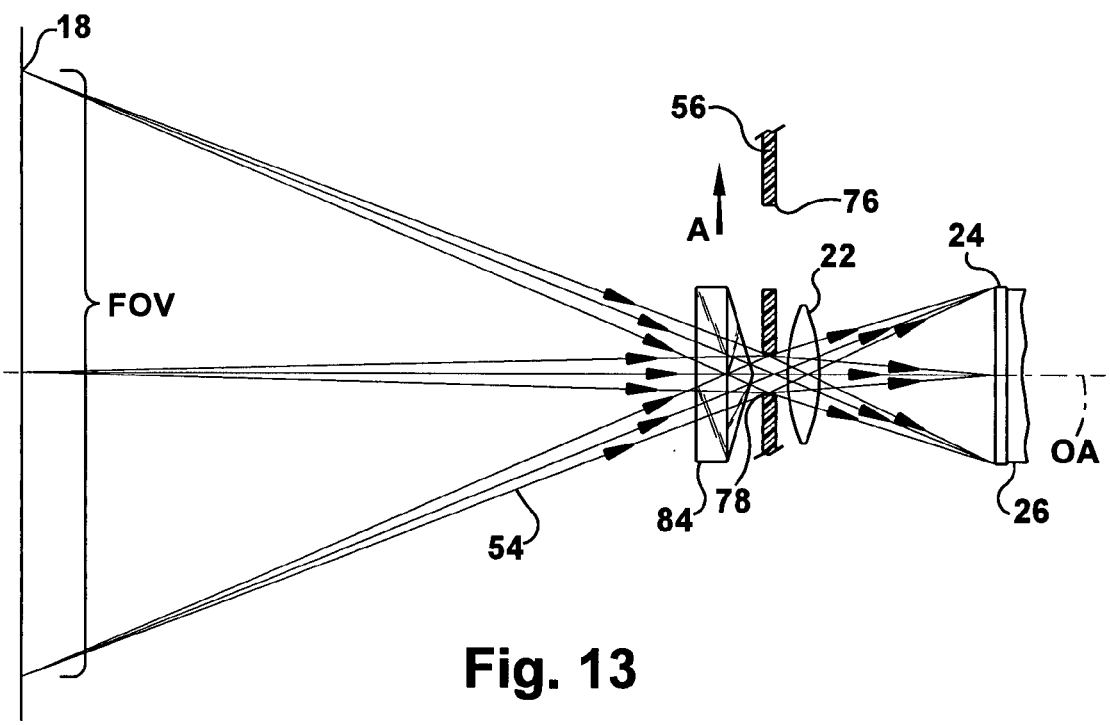
FIG. 13 is a schematic diagram of a selectable aperture constructed in accordance with the embodiment of FIG. 12 in a second position.

Defocus is also controlled in the present invention by the use of an axicon element as a source of additional optical power. Illustrated in FIGS. 12 and 13 is yet another embodiment incorporating optical power in the form of a forward axicon element 84. The forward axicon element 84 is positioned such that the reflected target image 54 first passes through the axicon before entering the first and second apertures 76 and 78 located within the selectable aperture 56. The position of the additional optical element, including the forward axicon element 84 relative to the selectable aperture 56 can range from the aperture plane to a distance of a few centimeters. For a wide angle FOV imaging scanner 10, the preferred location would be at a close proximity to the aperture plane.

In FIG. 12, the reflected target image 54 passes through axicon element 84 and first aperture 76 of the selectable aperture 56 onto the imaging lens 22. Upon determination by the auto-position system 70, as discussed above or by manual movement, the selectable aperture 56 is advanced in the direction of the arrow A in FIG. 13. In FIG. 13, the reflected target image 54 passes through the axicon element 84 and second aperture 78 of the selectable aperture 56 onto the imaging lens 22. Accordingly, the auto-positioning system 70 can retract the selectable aperture 56 back to the position of FIG. 12 if the first aperture 76 provides a more desirable image.

For the reasons described above, apertures 76, 78 positioned in front of the imaging lens 22 provide an extended depth of focus and increased range of EFL, which under certain application specific conditions is further relatively enhanced by the smaller aperture 78. This focusing condition is further improved by the introduction of additional optical power provided by the axicon element 84 truncated by a smaller aperture positioned at a forward location relative to the selectable aperture 56.

Figure 14:
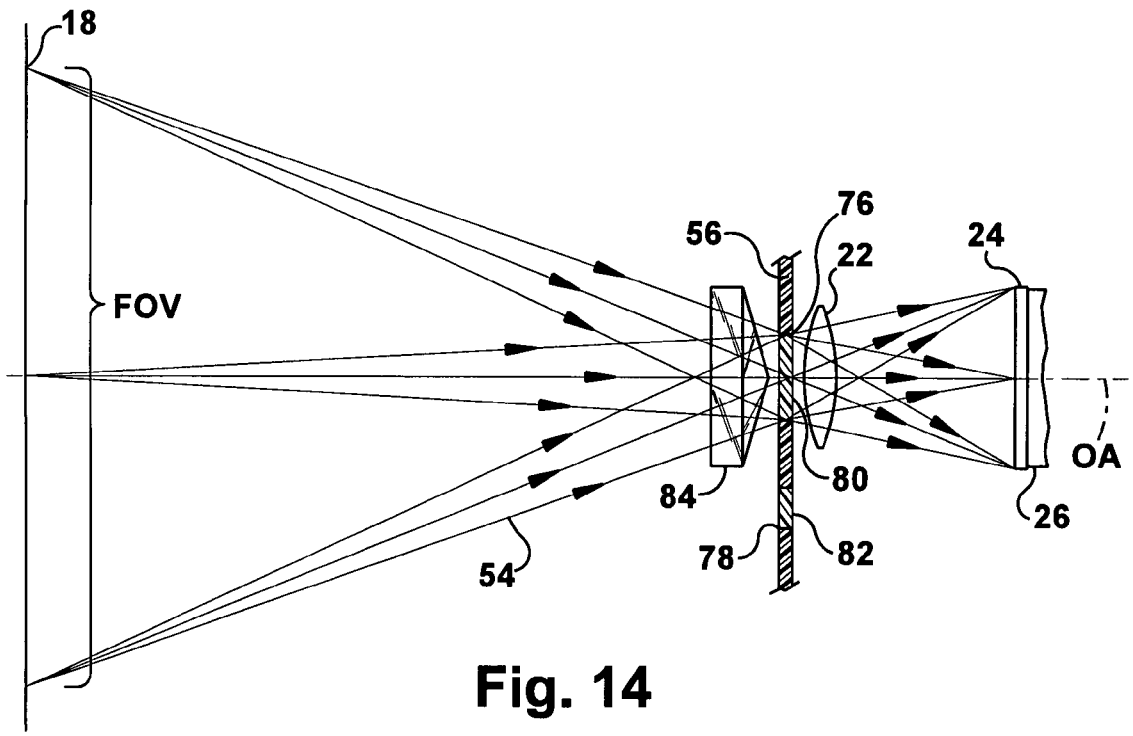
FIG. 14 is a schematic diagram of a selectable aperture constructed in accordance with another example embodiment of the present invention incorporating an axicon lens.
Figure 15:
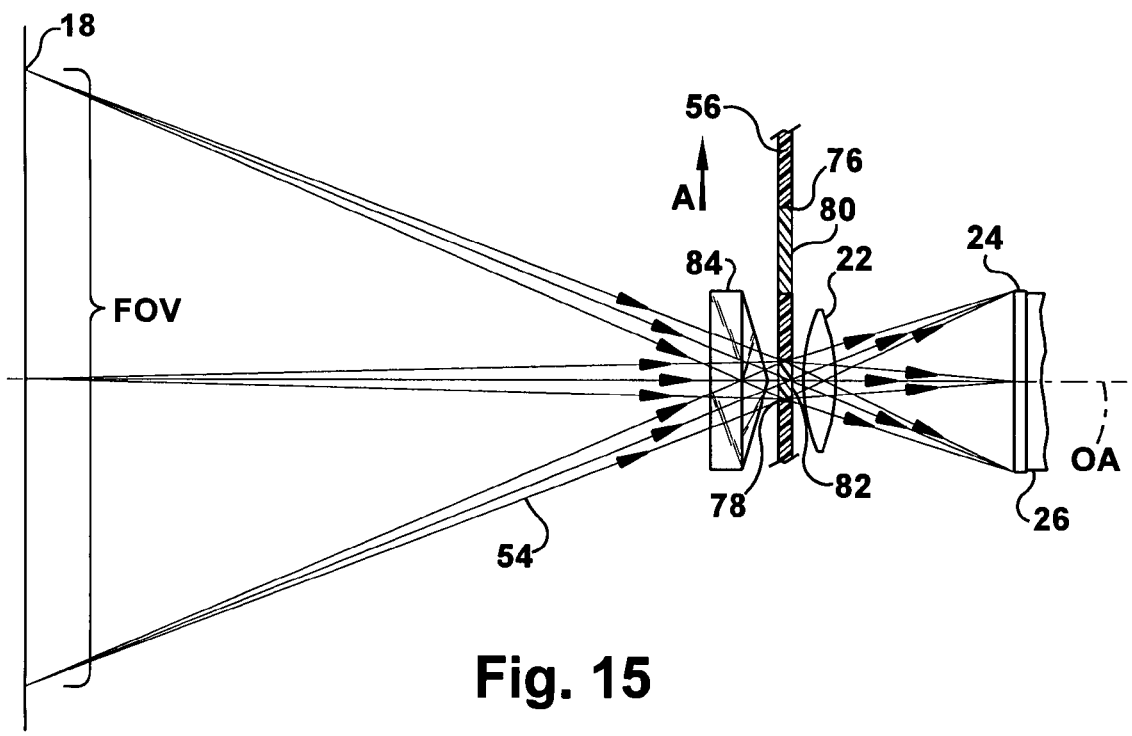
FIG. 15 is a schematic diagram of a selectable aperture constructed in accordance with the embodiment of FIG. 14 in a second position.

FIGS. 14 and 15 illustrate another embodiment in which multiple optical elements are used for adjusting EFL according to the application needs to bring the conjugated distance to a desired location as close as possible to the imaged object. The multiple optical elements include the forward axicon element 84 positioned in front the selectable aperture 56 containing first and second apertures 76 and 78 and integrally molded first and second optical elements 80, 82, respectively.

Particularly, FIG. 14 illustrates the reflected target image 54 passing through forward axicon element 84 and first aperture 76 containing first optical element 80 before passing onto the imaging lens 22. Upon determination by the auto-position system 70, as discussed above or by manual movement, the selectable aperture 56 is advance in the direction of the arrow A in FIG. 15. In FIG. 15, the reflected target image 54 first passes through the forward axicon element 84 and second aperture 78 containing second optical element 82 before passing onto the imaging lens 22. Accordingly, the auto-positioning system 70 can retract the selectable aperture 56 back to the position of FIG. 14 if the first aperture 76 and optical element 80 provide a more desirable image.

For the reasons described above, apertures 76, 78 positioned in front of the imaging lens 22 provide an extended depth of focus and increased range of EFL, which under certain application specific conditions is further relatively enhanced by the smaller aperture 78. This focusing condition is further improved by the introduction of additional optical power provided by the axicon element 84 positioned at a forward location relative to the selectable aperture 56 and integrally molded first and second optical elements 80, 82.

Figure 16:
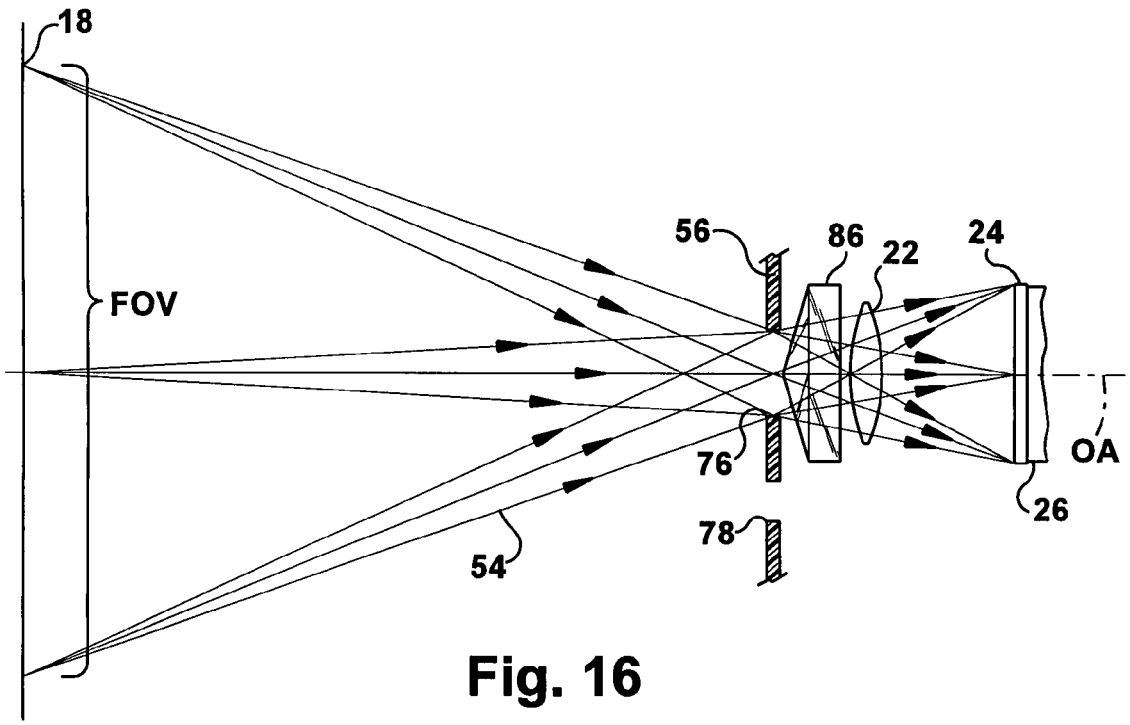
FIG. 16 is a schematic diagram of a selectable aperture constructed in accordance with another example embodiment of the present invention incorporating an axicon lens.
Figure 17:
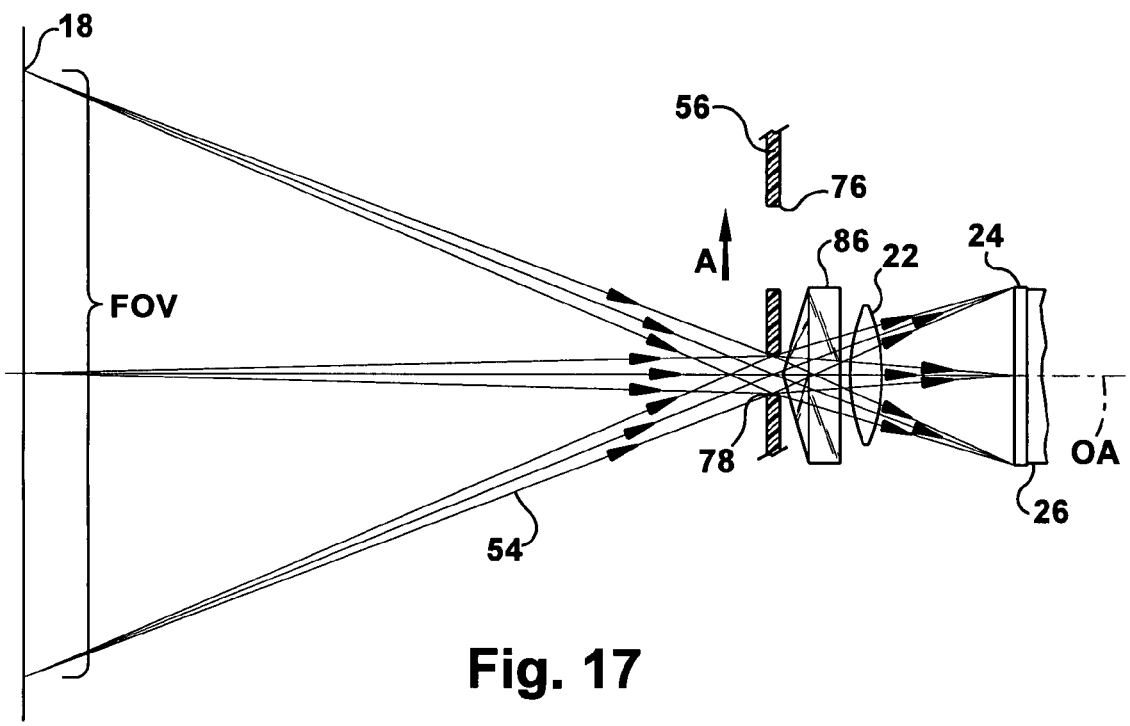
FIG. 17 is a schematic diagram of a selectable aperture constructed in accordance with the example embodiment of FIG. 16 in a second position.

Defocus is also controlled by the embodiments illustrated in FIGS. 16 and 17, which incorporates additional optical power in the form of a rearward axicon element 86. The rearward axicon element 86 is positioned such that the reflected target image 54 first passes through the selectively chosen first or second apertures 76 and 78 located within the selectable aperture 56 before entering the rearward axicon element 86. The rearward axicon element 86 provides additional optical power to the reflected target image 54 before entering the imaging lens 22.

FIG. 16 illustrates the reflected target image 54 passing through first aperture 76 of the selectable aperture 56 and subsequently the rearward axicon element 86 before passing onto the imaging lens 22. Upon determination by the auto-position system 70, as discussed above or by manual movement, the selectable aperture 56 is advance in the direction of the arrow A in FIG. 17. In FIG. 17, the reflected target image 54 first passes through the second aperture 78 of the selectable aperture 56 before passing through the rearward axicon element 86 onto the imaging lens 22. Accordingly, the auto-positioning system 70 can retract the selectable aperture 56 back to the position in FIG. 16 if the first aperture 76 provides a more desirable image.

For the reasons described, apertures 76, 78 positioned in front of the imaging lens 22 provide an extended depth of focus and increased range of EFL, which under certain application specific conditions is further relatively enhanced by the smaller aperture 78. This focusing condition is further improved by the introduction of additional optical power provided by the axicon element 86 positioned at a rearward location relative to the selectable aperture 56.

Figure 18:
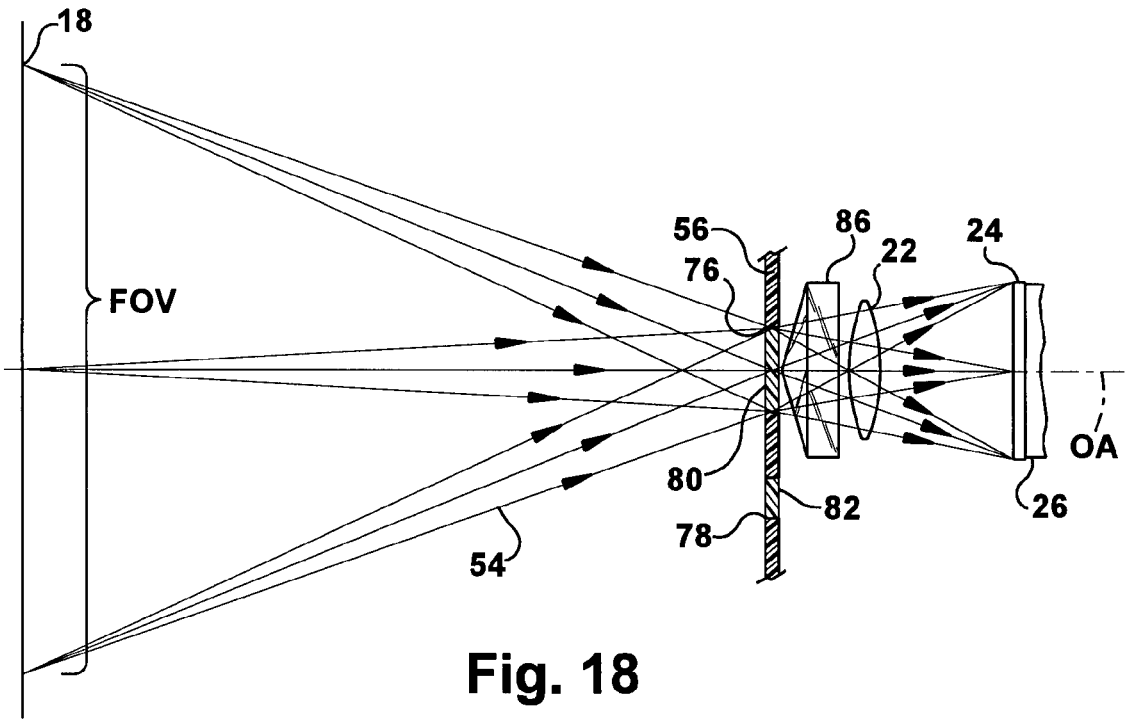
FIG. 18 is a schematic diagram of a selectable aperture constructed in accordance with another example embodiment of the present invention incorporating an axicon lens.
Figure 19:
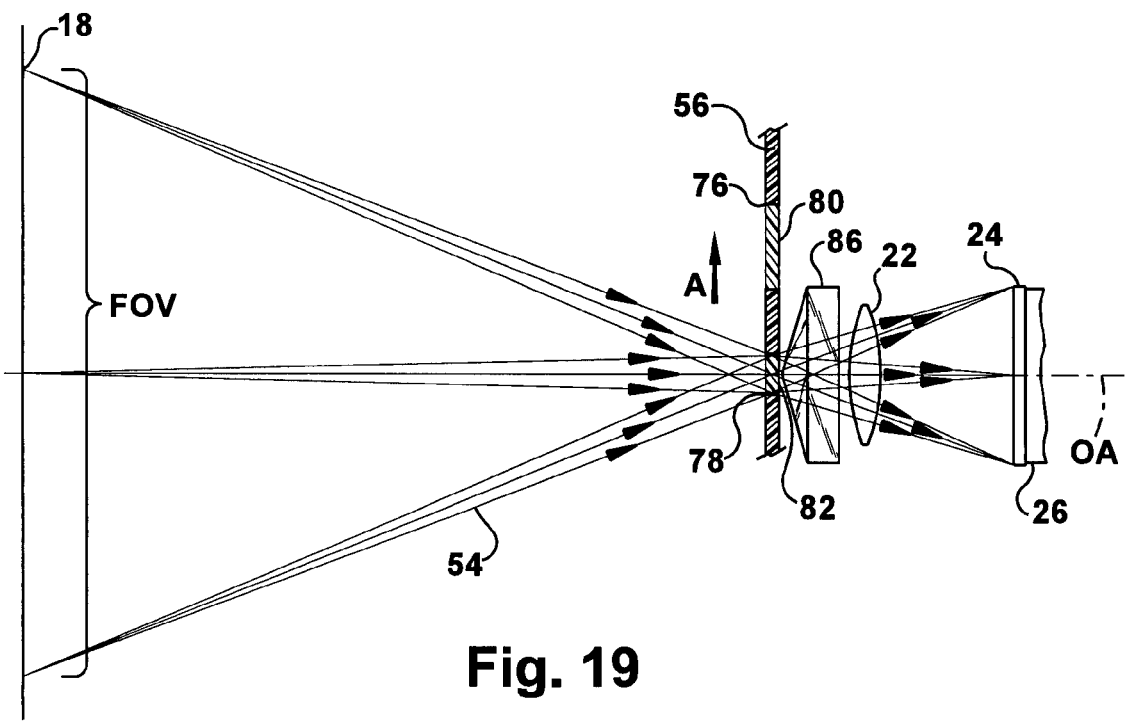
FIG. 19 is a schematic diagram of a selectable aperture constructed in accordance with the example embodiment of FIG. 18 in a second position.

Illustrated in FIGS. 18 and 19 is yet another embodiment in which multiple optical elements are used for increasing depth of focus of the reflected target image 54 and providing additional defocus. The multiple optical elements include the rearward axicon element 86 positioned in the rear of the selectable aperture 56 containing first and second apertures 76, and 78 and integrally molded first and second optical elements 80, 82, respectively.

Particularly, FIG. 18 illustrates the reflected target image 54 passing through first aperture 76 and optical element 80 before passing through rearward axicon element 86 that provides additional optical power to the reflected target image before entering the imaging lens 22, which focuses the image onto the imaging sensor 24. Upon determination by the auto-position system 70, as discussed above or by manual movement, the selectable aperture 56 is advance in the direction of the arrow A in FIG. 19. In FIG. 19, the reflected target image 54 first passes through the second aperture 78 and second optical element 82 of the selectable aperture 56 before passing through the rearward axicon element 86 onto the imaging lens 22. Accordingly, the auto-positioning system 70 can retract the selectable aperture 56 back to the position in FIG. 18 if the first aperture 76 and optical element 80 provide a more desirable image.

For the reasons described, apertures 76, 78 positioned in front of the imaging lens 22 provide an extended depth of focus and an increased range of EFL, which under certain application specific conditions is further relatively enhanced by the smaller aperture 78. This focusing condition is further improved by the introduction of additional optical power provided by the axicon element 86 positioned at a rearward location relative to the selectable aperture 56 and integrally molded first and second optical elements 80, 82.

Figure 20:
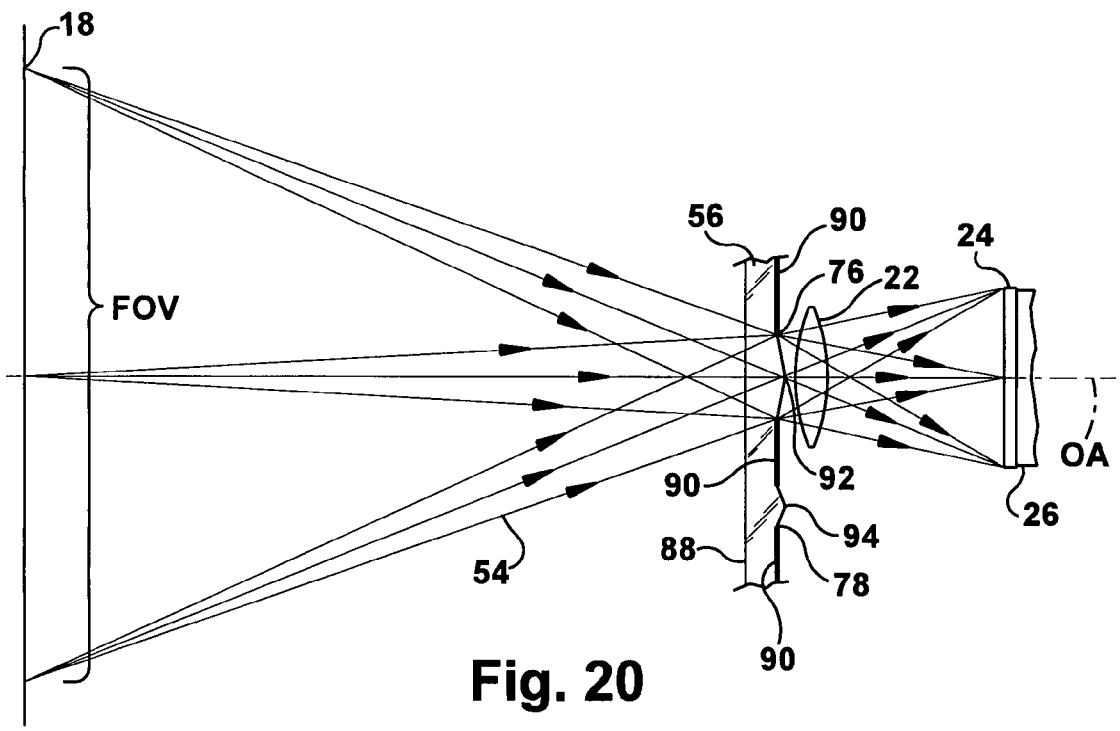
FIG. 20 is a schematic diagram of a selectable aperture constructed in accordance with another example embodiment of the present invention.
Figure 21:
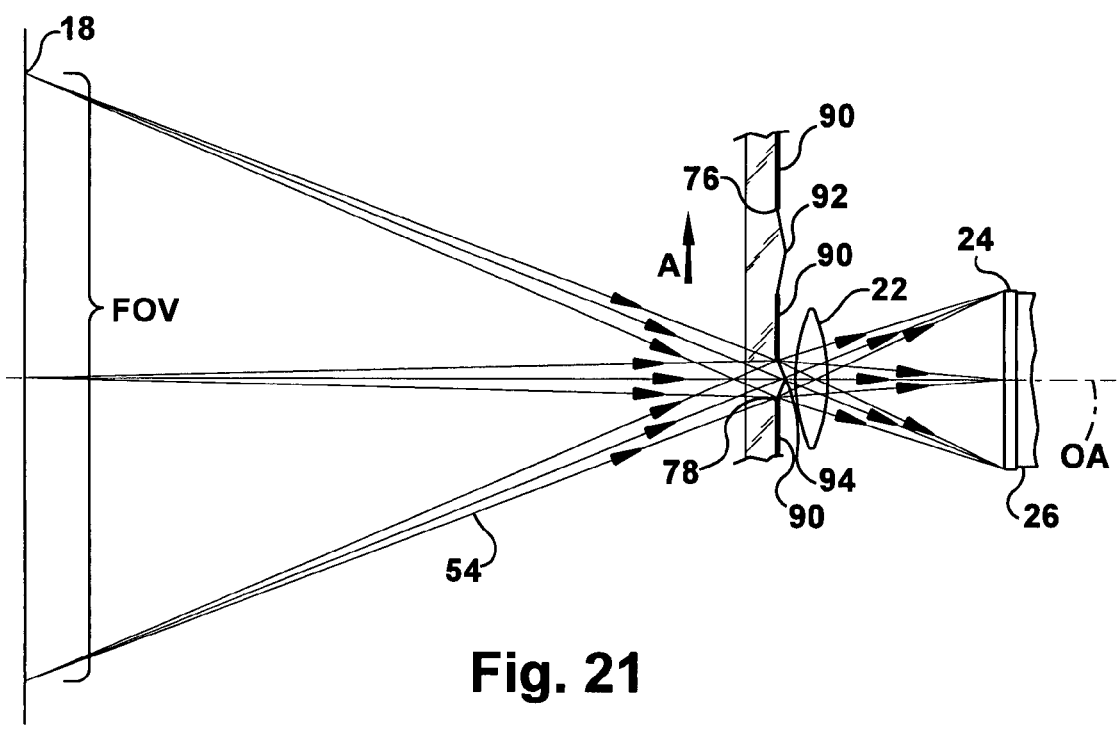
FIG. 21 is a schematic diagram of a selectable aperture constructed in accordance with the example embodiment of FIG. 20 in a second position.

FIGS. 20 and 21 illustrate another exemplary embodiment in which the selectable aperture 56 and optical elements 92 and 94 are made into a single aperture stop. Non-translucent material 90 is added to the rear portion of the selectable aperture 56 to form first and second apertures 76, 78, respectively. The optical elements 92 and 94 can assume any known shape or size of lens, including cylindrical, spherical, aspherical, converging, and diverging shapes without departing from the spirit and scope of the claimed invention.

In FIG. 20, the reflected target image 54 passes through the selectable aperture 56 and optical element 92 and is focused as the image exits the first aperture 76. The reflected target image 54 then enters imaging lens 22 and is focused on the imaging sensor 24. Upon determination by the auto-position system 70, as discussed above or by manual movement, the selectable aperture 56 is advance in the direction of the arrow A in FIG. 21. In FIG. 21, the reflected target image 54 first passes through the selectable aperture 56 containing optical element 94 and exits through the aperture 78 before entering the imaging lens 22. Accordingly, the auto-positioning system 70 can retract the selectable aperture 56 back to the position in FIG. 20 if the first aperture 76 and optical element 92 provide a more desirable image.

For the reasons described, apertures 76, 78 positioned in front of the imaging lens 22 provide an extended depth of focus and increased range of EFL, which under certain application specific conditions is further relatively enhanced by the smaller aperture 78. This focusing condition is further improved by the introduction of additional optical power provided by the optical elements 92 and 94 positioned in, and through the selectable aperture 56.

Figure 22:
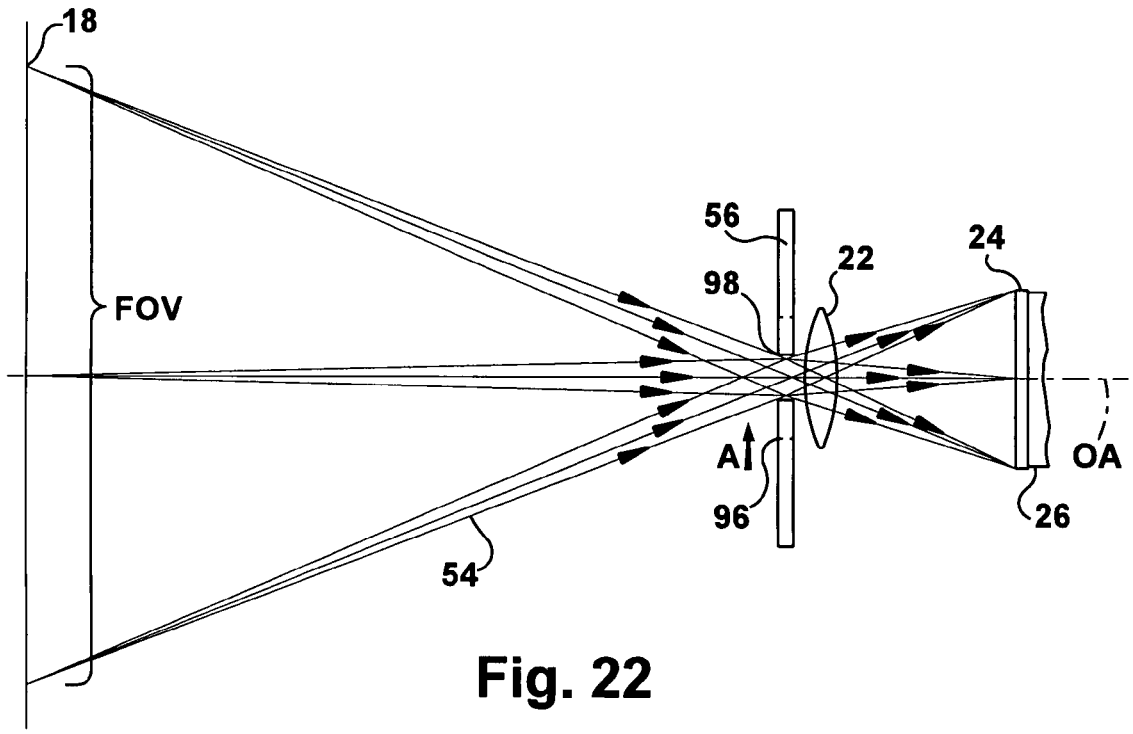
FIG. 22 is a schematic diagram of a selectable aperture constructed in accordance with another example embodiment of the present invention.

In the illustrated embodiment of FIG. 22, the selectable aperture 56 contains a single iris type opening aperture in which the diameter can be adjusted. The iris aperture transitions to and from a number of diametrical openings. For example, a first opening 96 provides a larger diameter that is reduced to a second opening 98. Alternatively, the iris type opening aperture has a sliding slit of variable width.

Upon determination by the auto-position system 70, as discussed above or by manual movement, the selectable aperture 56 is advance in the direction of the arrow A from the first opening 96 to form the second opening 98. In FIG. 22, the reflected target image 54 first passes through the selectable aperture 56 containing iris aperture opening 98, which truncates the wavefront from the target image 54 before entering the imaging lens 22. Accordingly, the auto-positioning system 70 can retract the selectable aperture 56 back to a larger opening, for example aperture opening 96 if it provides a more desirable image.

Figure 23:
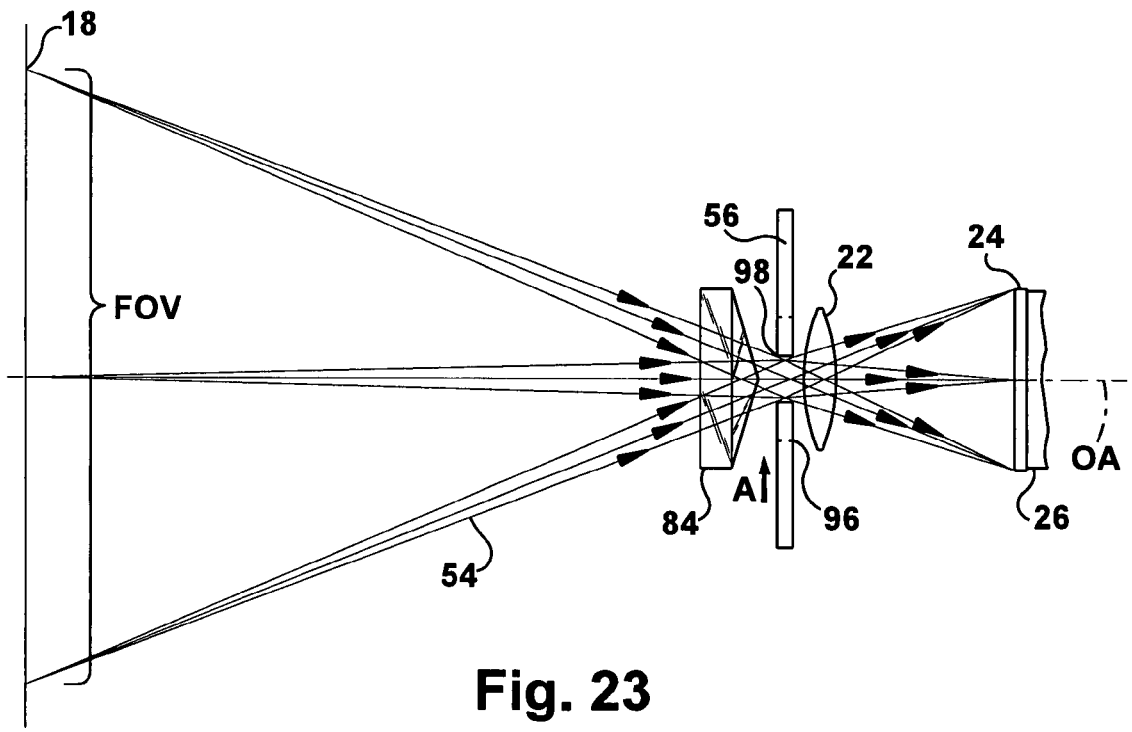
FIG. 23 is a schematic diagram of a selectable aperture constructed in accordance with another example embodiment of the present invention incorporating an axicon lens.
Figure 24:
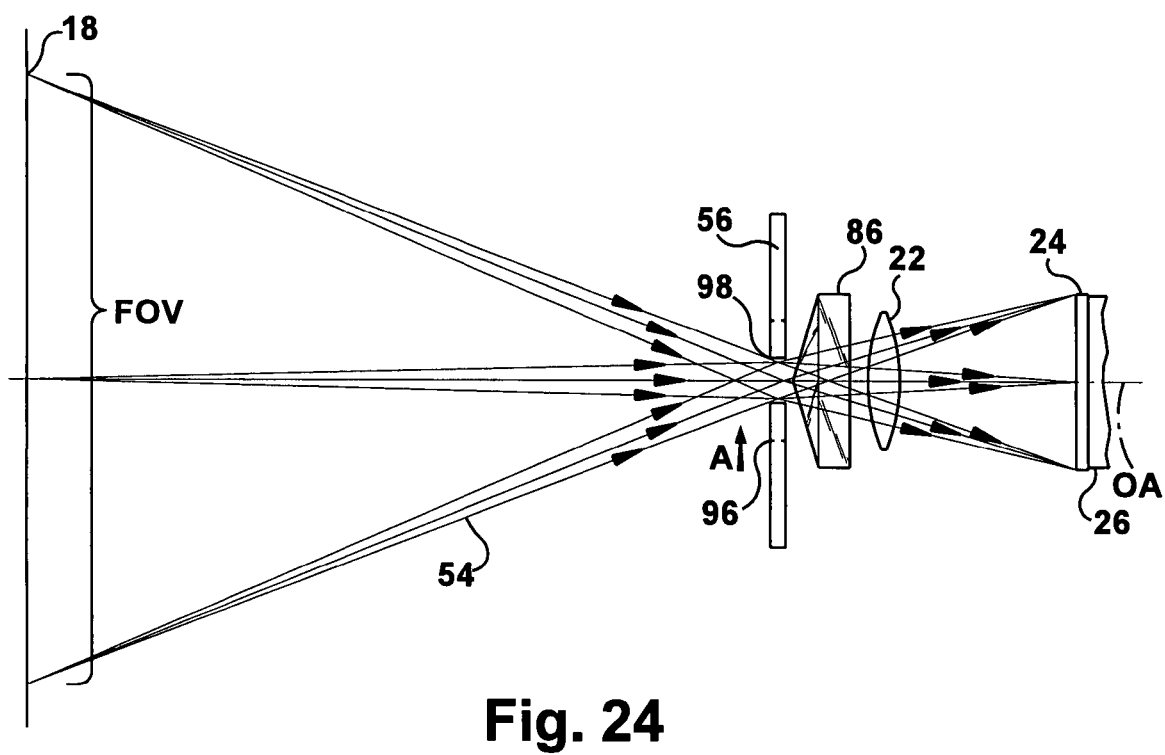
FIG. 24 is a schematic diagram of a selectable aperture constructed in accordance with another example embodiment of the present invention incorporating an axicon lens.

For the reasons described, variable aperture openings 96 and 98 positioned in front of the imaging lens 22 provide an extended depth of focus and increased range of EFL, which under certain application specific conditions is further relatively enhanced by a relatively smaller aperture opening. This focusing condition can be further improved by the introduction of additional optical power provided by the optical elements discussed above positioned in conjunction with the selectable iris aperture 56. For example, the embodiments illustrated in FIGS. 23 and 24 depict additional optical power provided by an axicon lens 84, 86, respectively. In FIG. 23 the forward axicon lens 84 is positioned in a forward location relative to the selectable aperture 56. In FIG. 24 the rearward axicon lens 86 is positioned in a rearward location relative to the selectable aperture 56.

From the above description of the invention, those skilled in the art will perceive improvements, changes and modifications. Such improvements, changes and modifications within the skill of the art are intended to be covered by the appended claims.

I claim:

1. An apparatus for focusing an image of a target object comprising:
   imaging circuitry for analyzing an image reflected from a target object that is focused onto an imaging sensor coupled to said imaging circuitry;
   a fixed imaging lens for focusing the reflected image onto said imaging sensor, the fixed imaging lens having an optical axis in alignment with the imaging sensor;
   a selectable aperture comprising a plurality of apertures of varying sizes, one of said plurality of apertures being selectively selected for optically enhancing the said fixed imaging lens, wherein the plurality of apertures comprises at least one aperture that has an optical element fixed thereon having an optical axis thereof aligned with a center of the at least one aperture; and
   an actuator coupled to said selectable aperture for selectively selecting said one of said plurality of apertures by moving the selectable aperture along with the plurality of apertures with translational motion in a direction transverse to optical axis for optically enhancing said fixed imaging lens by limiting amount of spherical aberration of said fixed imaging lens; and
   wherein said actuator coupled to said selectable aperture such that said one of said plurality of aperture is automatically selected by an algorithm residing within an imaging engine of the imaging circuitry that evaluates the proper size of said one aperture.

2. The apparatus of claim 1 wherein said optical element is an axicon lens.

3. The apparatus of claim 2 wherein said axicon lens is positioned along said optical axis of the imaging lens between said selectable aperture and said fixed imaging lens when said selectable aperture is selected.

4. The apparatus of claim 2 wherein said axicon lens is positioned along said optical axis between said target object and selectable aperture when said selectable aperture is selected.

5. The apparatus of claim 1 wherein said optical element is positioned within said selectable aperture.

6. The apparatus of claim 1 wherein said optical element is at least one of a spherical, aspherical, cylindrical, diverging, and/or converging lens.

7. The apparatus of claim 1 wherein said selectable aperture is an iris diaphragm aperture or a sliding slit of variable width.

8. The apparatus of claim 7 wherein said optically enhancing of the fixed imaging lens is further enhanced by aligning an optical element between said target object and fixed imaging lens along said optical axis of the fixed imaging lens.

9. The apparatus of claim 1 wherein said optical element and selectable aperture are integrally molded into a single optical device.

10. A method of focusing an image of a target object comprising the steps of:
    receiving an image reflected from a target object onto a fixed position imaging lens having an optical axis in alignment with an imaging sensor;
    focusing said reflected image with said fixed position imaging lens from the target object onto said imaging sensor;
    selecting one of a plurality of aperture sizes from a selectable aperture, said one of said plurality of apertures being selectively positioned for optically enhancing the image through the fixed position imaging lens onto said an imaging sensor, wherein the plurality of apertures comprises at least one aperture that has an optical element fixed thereon having an optical axis thereof aligned with a center of the at least one aperture;
    actuating the selectable aperture with an actuator in an orientation transverse to said optical axis of the fixed position imaging lens to move the selectable aperture along with the plurality of apertures with translational motion such that said one of the plurality of apertures obtains said selectively positioned orientation for optically enhancing the fixed imaging lens; and
    wherein said step of actuating the selectable aperture is such the said one of said plurality of apertures is automatically selected by an algorithm residing within an imaging engine of the imaging circuitry that calculates the proper size of said one aperture.

11. The method of claim 10 wherein said optical element is an axicon, spherical, cylindrical, aspherical, converging or diverging lens.

* * * * *

UNITED STATES PATENT AND TRADEMARK OFFICE
CERTIFICATE OF CORRECTION

PATENT NO. : 8,313,031 B2
APPLICATION NO. : 11/731504
DATED : November 20, 2012
INVENTOR(S) : Vinogradov Page 1 of 1

It is certified that error appears in the above-identified patent and that said Letters Patent is hereby corrected as shown below:

In the Claims

In Column 12, Line 33, in Claim 10, delete "fixed imaging lens; and" and insert -- fixed imaging lens by limiting amount of spherical aberration of said fixed imaging lens; and --, therefor.

In Column 12, Line 35, in Claim 10, delete "such the" and insert -- such that --, therefor.

Signed and Sealed this
Twenty-third Day of April, 2013

Teresa Stanek Rea
*Acting Director of the United States Patent and Trademark Office*